March 6, 1951 F. D. WALTHER 2,544,370
SLIDABLY ADJUSTABLE BIRDCALL
Filed May 20, 1948

Fletcher D. Walther,
Inventor.
Haynes and Koenig,
Attorneys.

Patented Mar. 6, 1951

2,544,370

UNITED STATES PATENT OFFICE 2,544,370

SLIDABLY ADJUSTABLE BIRDCALL

Fletcher D. Walther, Kirkwood, Mo.

Application May 20, 1948, Serial No. 28,209

8 Claims. (Cl. 46—180)

This invention relates to bird calls, and more particularly to a vibratory-reed bird call for selectively reproducing the call of a duck or a crow.

Among the several object of the invention may be noted the provision of a vibratory-reed type of bird call adapted more realistically to simulate the call of a duck or crow; the provision of a call of the class described having a single reed which is readily adjustable for producing tones simulating the calls of either a duck or a crow; and the provision of a bird call of this class comprising relatively few and simple parts which may be economically manufactured and easily assembled. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments is illustrated, Fig. 1 is a plan view of the bird call device of this invention;

Figure 1:
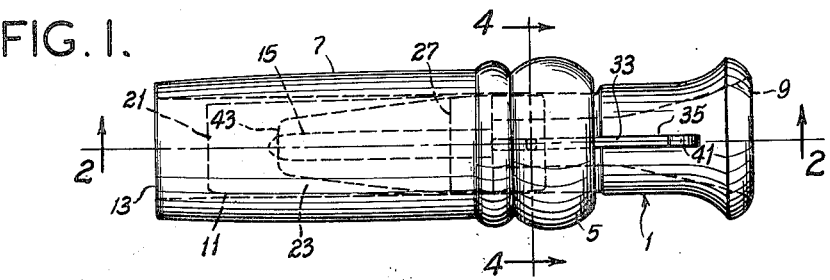

Referring to the drawings, the device of this invention is shown to comprise a bell 1 removably press-fitted at its rearward end 3 into the outlet end 5 of a tube 7 constituting a mouthpiece. A flaring portion 9 of the bell extends forward. The bell and mouthpiece are preferably turned from wood. The bell is formed with a tongue 11 extending from its inner end within the mouthpiece rearward toward the air inlet end 13 of the mouthpiece. The tongue has a longitudinal groove 15 leading from adjacent its rearward end into the rearward end of the bell at 17. The tongue, as illustrated, is of semi-circular cross section with the groove 15 in its flat surface 19. The rearward end of the tongue is beveled as indicated at 21.

A vibratory reed 23, of thin resilient sheet metal, overlies the groove 15 and is longitudinally slidable on the surface 19 of the tongue. The forward end of the reed extends into the bell through a slot 25 cut in the rearward end of the bell. A sealing member 27 fitted in the inner end of the bell bears against the reed and has a sliding sealing fit with the reed. This closes off the inner end of the bell except for the groove 15 so as to confine flow of air from the inlet end of the mouthpiece to the bell. As shown, sealing member 27 comprises a wedge-shaped piece of cork or other resilient packing material inserted in a transverse wedge-shaped keyway 29 in the rearward end of the bell above the reed. The keyway 29 and the member 27 are divergent toward the forward end of the bell so as to key the member 27 against rearward movement.

The slot 25 and keyway 29 extend transversely completely across the inner end portion of the bell. At its forward end, the reed is of substantially the same width as the width of the bell at the slot 25. The sealing member 27 is also of substantially the same width as the width of the bell at the keyway 29. Consequently, the reed and sealing member are held against transverse movement by the portion of the mouthiece 7 surrounding the bell. The slot 25 preferably inclines slightly downward from the grooved surface of the tongue 11 so that the free length of the reed extending rearward from beneath the sealing member 27 is slightly upwardly inclined.

At 31 is shown a reed adjusting member for sliding the reed longitudinally. This member comprises a rod 33 longitudinally slidable in a longitudinal groove 35 in the periphery of the bell. Groove 35 extends from a point forward of the outlet end of the mouthpiece 7 to an elongate longitudinal slot 38 cut completely through the wall of the bell surrounded by the mouthpiece. A finger 37 extends inward from the rearward end of the rod through the slot 37 into an aperture 39 in the forward end of the reed. The rod also has an outwardly extending finger 41 at its forward end beyond the end of the mouthpiece for manipulation by the user. The reed may be longitudinally adjusted simply by moving the finger 41 in one longitudinal direction or the other as desired.

Figure 2:
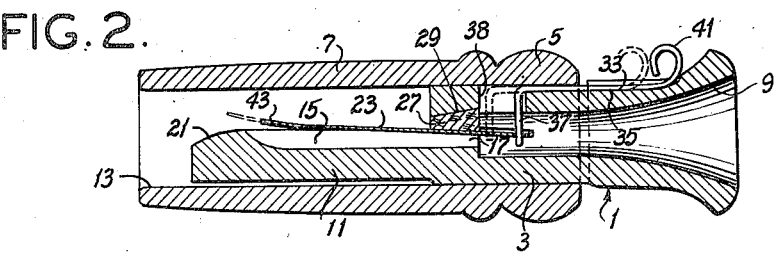
Fig. 2 is a longitudinal section taken on the line 2—2 of Fig. 1.
Figure 3:
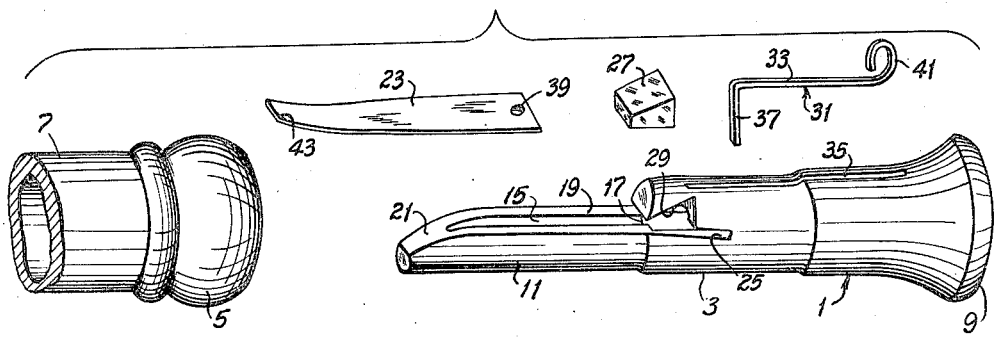
Fig. 3 is an exploded view of the device.
Figure 4:
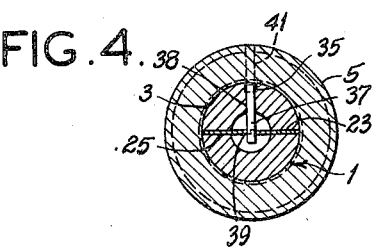
Fig. 4 is a transverse section taken on the line 4—4 of Fig. 1.

The length of the reed and its range of movement as determined by the length of slot 38 are such that the reed may be moved between the forward position illustrated in solid lines in Fig. 2 wherein its rearward end 43 is forward of the rearward end of the groove 15, and a rearward extreme position wherein its rearward end extends over the rearward end of the groove. In the former position, the free length of the reed extending from beneath the sealing member 27 is a minimum, and when air is blown through the mouthpiece the reed vibrates in such manner as to produce a sound having a relatively high pitch simulating the call of a crow. In this position the reed can never entirely close the slot 15. In the latter position, the free length of the reed is a maximum, and the reed accordingly vibrates more slowly to produce a sound having a lower pitch simulating the call of a duck. In this adjustment the reed in vibrating tends to close the entire slot 15. This introduces a gutteral sound. The rearward end of the reed is illustrated as bent upward from the tongue 11 to provide a throat for entrance of air into the groove.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A bird call comprising a tube having air inlet and outlet ends, said tube interiorly having a longitudinal groove leading from adjacent the inlet to the outlet end of the tube, a vibratory reed overlying said groove and longitudinally slidable within the tube, a sealing member in the tube adjacent its outlet end bearing against the reed and having a sliding sealing fit with the reed to confine to the passage formed by the reed and the groove flow of air from the inlet to the outlet end of the tube, said reed being longitudinally slidably adjustable from the exterior of the tube to vary the free length of the reed extending rearward from the sealing member.

2. A bird call comprising a tubular mouthpiece having air inlet and outlet ends, a bell at the outlet end of the mouthpiece, a tongue in the mouthpiece having a longitudinal groove leading from adjacent the inlet of the mouthpiece into the bell, a vibratory reed overlying said groove and longitudinally slidable on the tongue, a sealing member in the mouthpiece adjacent its outlet end bearing against the reed and having a sliding sealing fit with the reed to confine to the passage formed by the reed and the groove in the tongue flow of air from the inlet end of the mouthpiece to the bell, and a reed adjusting member coupled to the reed and accessible from the exterior of the call for longitudinally adjusting the reed to vary the free length of reed extending rearward from the sealing member.

3. A bird call comprising a tubular mouthpiece having air inlet and outlet ends, a bell fitted in the outlet end of the mouthpiece and having a flaring portion extending out of the mouthpiece, a tongue extending from the inner end of the bell within the mouthpiece rearward toward the inlet end of the latter, said tongue having a longitudinal groove leading from adjacent its rearward end into the bell, a vibratory reed overlying said groove and longitudinally slidable on the tongue, a sealing member closing the inner end of the bell except for the groove and having a sliding sealing fit with the reed to confine to the passage formed by the reed and the groove in the tongue flow of air from the inlet end of the mouthpiece to the bell, said reed, at its forward end, extending into the bell, and a reed adjusting member coupled to the forward end of the reed and extending out of the bell so as to be exteriorly accessible for longitudinally adjusting the reed.

4. A bird call as set forth in claim 3 wherein said reed is of such length and has such a range of movement that it may be moved between a rearward extreme position wherein its rearward end extends over the rearward end of the groove and a forward position wherein its rearward end is forward of the rearward end of the groove.

5. A bird call comprising a bell having a tongue extending rearward from its rearward entrance end, said tongue having a longitudinal groove extending from adjacent its rearward end into the bell, a vibratory reed overlying said groove and longitudinally slidable on the tongue, said reed extending at its forward end through a slot in the rearward end of the bell into the bell, a resilient sealing member fitted in the rearward end of the bell bearing against the reed and having a sliding sealing fit therewith, a reed adjusting member comprising a rod longitudinally slidable in a longitudinal groove in the periphery of the bell having a finger at its rearward end extending inward through an elongate slot in the wall of the bell into an aperture in the forward end of the reed, and having an outwardly extending finger at its forward end for manipulation by the user, and a tubular mouthpiece telescoped at its forward end on the rearward end of the bell surrounding the rod and holding it in assembled relation with the bell.

6. A bird call as set forth in claim 5 wherein said resilient sealing member comprises a wedge-shaped piece of cork or the like inserted in a transverse wedge-shaped keyway in the rearward end of the bell and diverging toward the forward end of the bell.

7. A bird call as set forth in claim 5 wherein the slot in the rearward end of the bell extends completely transversely across the bell and the reed at its forward end is substantially of the same width as the width of the bell at the slot so that the portion of the mouthpiece surrounding the bell holds the reed against transverse movement.

8. A bird call as set forth in claim 5 wherein said reed is of such length and has such a range of movement that it may be moved between a rearward extreme position wherein its rearward end extends over the rearward end of the groove and a forward position wherein its rearward end is forward of the rearward end of the groove.

FLETCHER D. WALTHER.

REFERENCES CITED

The following references are of record in the file of this patent:

UNITED STATES PATENTS

| Number | Name | Date |
|---|---|---|
| 742,680 | Kuhlemeier | Oct. 27, 1903 |
| 825,610 | Olt | July 10, 1906 |
| 1,060,946 | Riday | May 6, 1913 |
| 2,411,380 | Maccaferri | Nov. 19, 1946 |